T. D. Bailey,
Chimney Cap.
No. 112,529. Patented Mar. 14, 1871.
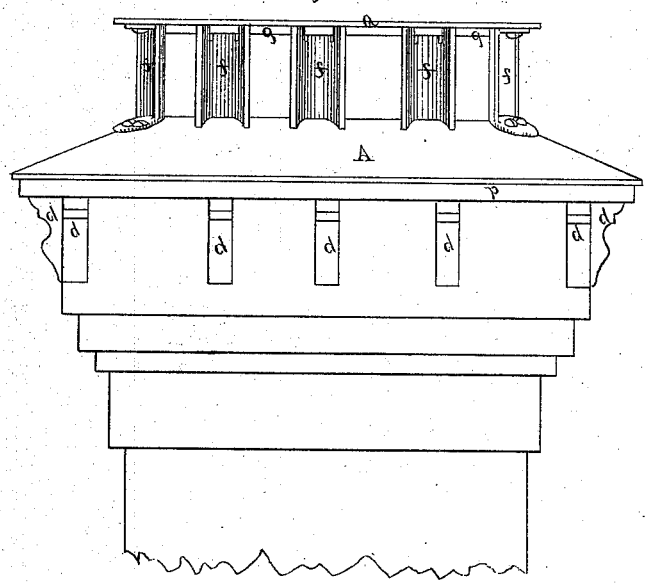
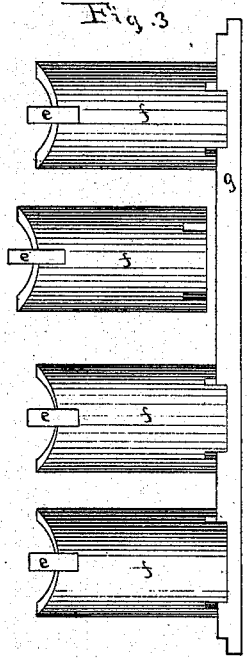
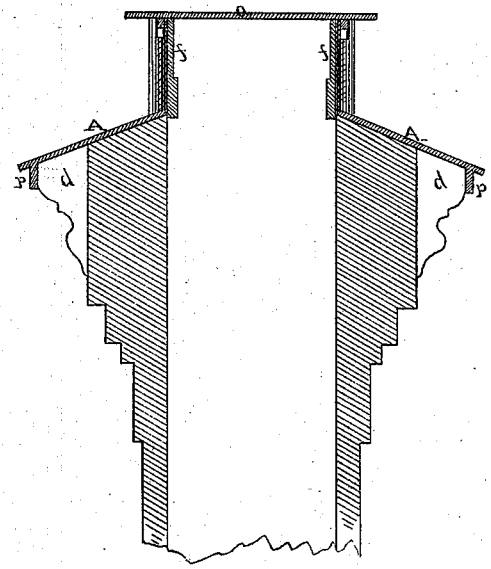
Witness
John E. Brune
A. A. Hart
Inventor
Thomas D. Bailey T. D. Bailey,
Chimney Cap.
No. 112,529.  Patented Mar. 14, 1871.
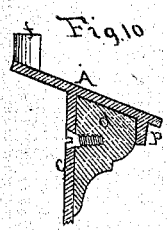
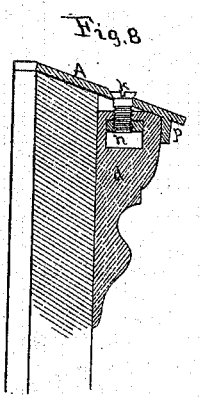
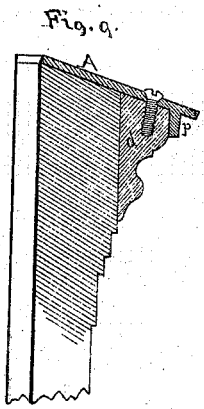
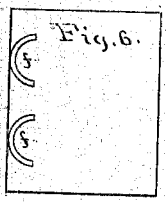
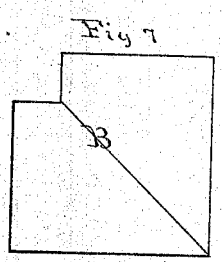
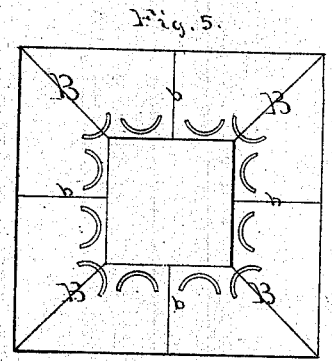
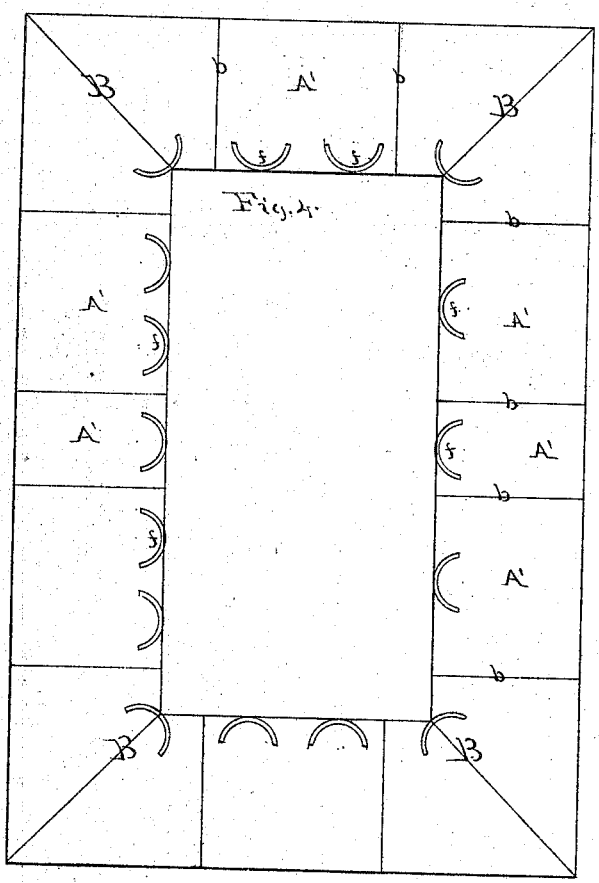
Witnesses
John E. Crane
A. A. Hart
Inventor
Thomas D. Bailey